United States Patent
McCoy et al.

(10) Patent No.: US 7,899,481 B2
(45) Date of Patent: Mar. 1, 2011

(54) REFERENCE SIGNAL SELECTION TECHNIQUES FOR A WIRELESS COMMUNICATION SYSTEM

(75) Inventors: James W. McCoy, Austin, TX (US); Ning Chen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1016 days.

(21) Appl. No.: 11/688,129

(22) Filed: Mar. 19, 2007

(65) Prior Publication Data

US 2008/0232300 A1  Sep. 25, 2008

(51) Int. Cl.
*H04Q 7/20* (2006.01)
(52) U.S. Cl. .............................. 455/522; 455/69; 455/450
(58) Field of Classification Search .................... 455/450
See application file for complete search history.

(56) References Cited

U.S. PATENT DOCUMENTS

| | | | |
|---|---|---|---|
| 5,987,307 A * | 11/1999 | Buskirk et al. | 455/73 |
| 2003/0081569 A1* | 5/2003 | Sexton et al. | 370/329 |
| 2007/0019667 A1* | 1/2007 | Mottier et al. | 370/458 |

OTHER PUBLICATIONS

Qualcomm Incorporated/Aspects of HSUPA Network Planning80-W1159-1, 30pgs.*
Aspects of HSUPA Network Planning/80-W1159-1/revB/Qualicomm Incorporated.*

* cited by examiner

*Primary Examiner* — Nghi H Ly
*Assistant Examiner* — Joseph Dean, Jr.
(74) *Attorney, Agent, or Firm* — Dillon & Yudell LLP

(57) ABSTRACT

A technique for improving link performance in a wireless communication system includes detecting whether subscriber stations in the wireless communication system are power-limited. The subscriber stations include at least a first subscriber station that is power-limited and a second subscriber station that is not power-limited. The technique assigns a first reference signal having a first cubic metric to the first subscriber station and a second reference signal having a second cubic metric to the second subscriber station. In this case, the first cubic metric is lower in magnitude than the second cubic metric.

19 Claims, 6 Drawing Sheets

UL REFERENCE SIGNAL INDEX

REFERENCE SIGNAL SELECTION TECHNIQUES FOR A WIRELESS COMMUNICATION SYSTEM

BACKGROUND

1. Field

This disclosure relates generally to reference signal selection and, more specifically, to reference signal selection techniques for user equipment in a wireless communication system.

2. Related Art

In general, coded orthogonal frequency division multiplexing (COFDM) systems support high data rate wireless transmission using orthogonal channels, which offer immunity against fading and inter-symbol interference (ISI) without requiring implementation of elaborate equalization techniques. Typically, COFDM systems split data into N streams, which are independently modulated on parallel spaced subcarrier frequencies or tones. The frequency separation between subcarriers is 1/T, where T is the COFDM symbol time duration. Each symbol may include a guard interval (or cyclic prefix) to maintain the orthogonality of the symbols. In general, COFDM systems have utilized an inverse discrete Fourier transform (IDFT) to generate a sampled (or discrete) composite time-domain signal. One undesirable attribute of COFDM systems is that they may exhibit relatively large peak-to-average power ratio (PAR), when signals from different subcarriers add constructively. A large PAR (and/or large cubic metric (CM)) is undesirable as it requires a large dynamic range for a digital-to-analog converter (DAC) implemented within a transmitter of a COFDM system. Consequently, the DAC may be used inefficiently as most subcarrier amplitudes use a fraction of the range of the DAC.

In a typical implementation, the output of the DAC is filtered before being applied to a power amplifier. As power amplifiers tend to be non-linear, in-band distortion and spectral spreading (or spectral regrowth) may occur. As is known, spectral regrowth may occur when a band-limited time-varying (non-constant) envelope signal is passed through a non-linear circuit. One technique for addressing non-linearity of a power amplifier has operated the power amplifier at a relatively large output power backoff (OBO). Unfortunately, operating a power amplifier at a relatively large OBO (or power de-rating) reduces the power efficiency of the amplifier. For example, at a 6 dB OBO, a power amplifier may exhibit a fifty percent (or more) loss in efficiency. To reduce the PAR and/or CM of COFDM systems, various designers have also implemented or proposed hard limiting (or clipping) directly on the signal to be transmitted. Unfortunately, directly clipping the signal to be transmitted may cause undesirable spectral regrowth and inter-user interference (or inter-carrier interference (ICI)) in systems that utilize multiple access mode.

Discrete Fourier transform-spread orthogonal frequency division multiplexing (DFT-SOFDM) has been proposed as the modulation technique for the uplink of evolved-universal terrestrial radio access (E-UTRA) systems. Single carrier transmission schemes, such as DFT-SOFDM, generally facilitate further power de-rating reduction through the use of, for example, specific modulation or coding schemes, or clipping and spectral filtering of a signal to be transmitted. Moreover, the PAR and CM of a basic DFT-SOFDM (or single carrier-frequency division multiple access (SC-FDMA)) system is generally reduced, as compared to the PAR and CM of a basic COFDM system. To further reduce the PAR and CM of basic DFT-SOFDM transmitters, one group of designers has proposed pre-processing an input signal prior to performing a DFT on a group of symbols associated with the input signal. Following this approach, selected input symbols and/or bits may be attenuated in order to reduce the PAR and CM at the output of an inverse discrete Fourier transform (IDFT) of the DFT-SOFDM system.

In general, wireless networks have used an estimated received signal strength and an estimated carrier to interference and noise ratio (CINR) of a received signal to determine operational characteristics of the networks. As one example, IEEE 802.16e compliant mobile stations are required to estimate a received signal strength indicator (RSSI) and a CINR of a received signal. In general, CINR at a mobile station (MS) may be calculated as the ratio of an RSSI of a serving base station (BS) to summed RSSIs of non-serving BSs added to a white noise power of a receiver of the MS. The RSSI associated with a serving BS may be used by an MS for uplink power control and the CINR, which is reported to a serving BS, may be used by the serving BS to adapt a downlink (DL) transmission rate to link conditions.

Accurate reported CINRs are usually desirable, as inaccurate reported CINRs may impact performance of a wireless network. For example, reporting a CINR that is above an actual CINR may decrease network throughput due to frame re-transmission, while reporting a CINR that is below the actual CINR may cause the serving BS to schedule data rates below a supportable data rate. According to IEEE 802.16e, RSSI and CINR estimates at an MS are derived based on a preamble signal, which is an orthogonal frequency division multiple access (OFDMA) symbol that is transmitted at the beginning of each OFDMA frame.

Similarly, wireless networks that employ third-generation partnership project long-term evolution (3GPP-LTE) compliant architectures are required to employ uplink (UL) reference signals (RSs), which are scheduled to user equipment (subscriber stations (SSs)) within a 3GPP-LTE network. Respective sequences of the RSs are used to uniquely identify an SS and, when transmitted from the SS to a serving base station (BS), may be used by the serving BS in channel estimation. In general, the RS sequences may be created through a number of different techniques and may have a wide range of associated CMs. As such, an RS assigned to one user may have a much larger CM than another RS assigned to another user. RSs with relatively high CMs may lead to relatively poor channel estimation by a serving BS.

What is needed are techniques for improving channel estimation in a wireless communication system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 6 is a block diagram of an example wireless communication system that may assign RSs to SSs according to various embodiments of the present disclosure.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and may have application to other embodiments of electronic devices such as personal digital assistants (PDAs), digital cameras, portable storage devices, audio players, computer systems, and portable gaming devices, for example.

Figure 1:
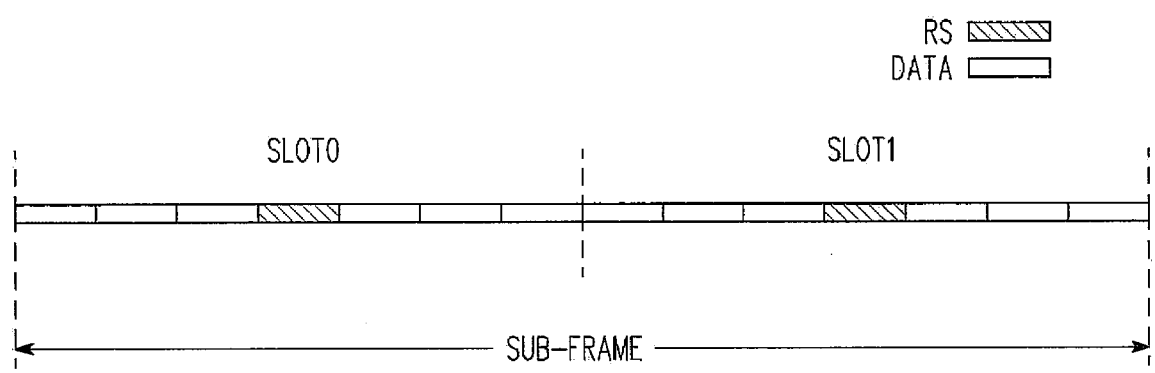
FIG. 1 is a diagram of an example uplink (UL) subframe that includes a reference signal (RS) positioned in a fourth (middle) symbol of each of two slots.

As noted above, uplink (UL) reference signals (RSs) may have different cubic metrics (CMs). Relatively large CMs (e.g., CMs greater than 1.5) may cause system power de-rating or clipping distortion in a power amplifier of a user equipment (UE) transmitter, depending upon the location of the UE within a cell. As is used herein, the term "user equipment" is synonymous with the term "subscriber station," which includes a wireless communication device that may (or may not) be mobile. As used herein, the term "channel" includes one or more subcarriers, which may be allocated adjacent to one another or distributed across a frequency band. According to one aspect of the present disclosure, a UL RS planning technique is employed to optimize UL power efficiency and minimize undesired distortion in subscriber station (SS) transmissions. In general, the UL RS planning technique reserves relatively low CM RSs (e.g., RSs having a CM below 1.2) for power-limited subscriber stations (SSs), e.g., SSs that are at or near a cell-edge. With reference to FIG. 1, an example UL subframe includes a demodulation RS positioned in a fourth (middle) symbol of each slot. In the illustrated example, a UL subframe includes two slots, each of which include seven long-blocks (LBs), which each individually encode a demodulation RS symbol. It should be appreciated that the techniques disclosed herein are broadly applicable to UL subframes that employ more or less than the illustrated number of LBs and are generally applicable to RSs in general (i.e., the techniques disclosed herein are generally applicable to other RSs, e.g., channel sounding RSs). As used herein, the term "demodulation RS" means an RS that is assigned to (and transmitted by) an SS, received by a serving base station (BS), and used by the serving BS for channel estimation.

As noted, UL reference signals (RSs) may take various forms, e.g., demodulation RSs and channel sounding RSs. A demodulation RS is associated with transmission of uplink data and/or control signals. In contrast, a channel sounding RS is not usually associated with uplink data transmission. In general, a demodulation RS is used to estimate a UL channel before decoding data transmitted on the UL channel. In this case, the demodulation RS has the same bandwidth as the data and occupies the same set of subcarriers as the data. UL RSs may be based on Zadoff-Chu (ZC) sequences, which are non-binary unit-amplitude sequences. Typically, ZC sequences have zero dB (decibel) PAR/CM and ideal cyclic autocorrelation and, as such, ZC sequences are constant amplitude zero autocorrelation (CAZAC) sequences. Cyclic shifted versions of a ZC sequence have low cross-correlation, which allows the impact of an interfering signal to be evenly spread in the time-domain, after correlating the received signal with a desired ZC sequence. In general this allows for more reliable detection of a desired channel. A ZC sequence may be given by:

$$a_u(k) = \exp\left(-j2\pi u \frac{k(k+1)/2 + qk}{N_G}\right)$$

where u, which ranges from 1 to $N_G-1$, is the ZC sequence index; k ranges from zero to $N_G-1$; $N_G$ is the length of the ZC sequence ($a_u(k)$); and q is any integer (for simplicity q may be set to zero).

When the sequence length $N_G$ is a prime number, $N_G-1$ base sequences can be obtained from the above equation and each sequence has near-optimal cross-correlation with its cyclic shifted version. In various implementations, a size of a UL resource block is an even number (e.g., a resource block length $N_P$ may be a multiple of twelve). The difference in size between a ZC RS and a UL resource block (RB) may lead to demodulation performance degradation. To mitigate performance degradation due to a difference in sequence length $N_G$ and RB length $N_P$, either truncation or cyclic extension of a prime length sequence can be used to generate a UL RS of length $N_P$. When truncation is used, the ZC sequence length may be selected as the smallest prime number that is greater than the RB length $N_P$. In this case, the last $N_G-N_P$ samples are truncated to reduce the sequence to the RB length $N_P$. When cyclic extension is used, the ZC sequence length ($N_G$) is selected as the largest prime number that is smaller than the RB length $N_P$. Using this approach, the first $N_P-N_G$ samples are copied and added to a tail of the sequence to extend the ZC sequence to the RB length $N_P$. The generated RS is then applied to reference signal subcarriers of the OFDM modulator (i.e., an IFFT). In this case, the RS is mapped onto the same set of subcarriers as the data and no DFT spreading occurs on the RS. For the generic frame structure (see FIG. 1), a demodulation RS is mapped to the fourth SC-FDMA symbol in each slot.

Creating RSs in this manner provides time-domain RSs that have a range of different cubic metrics (CMs). For example, for a ZC sequence of length eleven (corresponding to one RB with cyclic extension), there are ten different base sequences with CMs that vary from about 0.17 dB to 1.5 dB. As is discussed further below, CM may vary among RSs with different lengths, e.g., RSs with lengths of one RB, two RBs, and three RBs. In general, CMs of some demodulation RSs are even higher than the CM of QPSK (1.2 dB), which may cause performance degradation due to distortion on the demodulation RSs. Typically, only power-limited SSs (i.e., SSs operating at 24 dBm) are susceptible to high CMs. The performance degradation can be avoided by allocating low CM RSs to power limited SSs. In frequency division duplex (FDD) systems, a channel sounding RS is employed for providing channel state information to a scheduler to support channel dependent scheduling on a UL. The scheduler can instruct an SS to transmit a channel sounding RS at a particular time from one or more SS transmit antennas on all or a specified subset of the UL bandwidth. In this manner, channel sounding can be dynamically turned on (or off) and, thus, allow for adjustable spacing in time for overhead management.

A channel sounding RS for different transmit antennas at one SS, or from multiple SSs, can be orthogonal in at least two ways. For example, different sounding waveforms may occupy distinct subcarriers. In this case, orthogonality is achieved in the frequency-domain (i.e., the channel sounding RSs for different transmit antennas at one SS, or from multiple SSs, are sent in a frequency division multiplexed (FDM) fashion). As another example, channel sounding RSs may occupy a common set of subcarriers that are orthogonal in the code-domain. In this case, individual sounding waveforms may be distinguished by a specific cyclic shift of a single reference sequence in the time-domain (i.e., the channel sounding RSs for different transmit antennas at one SS, or from multiple SSs, are sent in a code division multiplexed (CDM) fashion). The channel sounding RSs can be generated by mapping a truncated or a cyclic extended ZC sequence to the set of subcarriers to be occupied by the channel sounding RSs. In case of truncation, the length of the sequence should usually be the smallest prime number that is greater than the length of the RB or RBs ($N_P$). A sounding waveform may be time-multiplexed into a UL subframe such that the channel sounding RS replaces one of the data symbols in the UL subframe.

As previously noted, to differentiate SSs (and/or cells), multiple unique RSs are usually implemented within a wireless network. As noted, different RSs usually have different CMs. RSs with relatively high CMs may require output power backoff (OBO) of a power amplifier of an associated SS transmitter to avoid non-linear distortion. As is known, employing OBO in a power amplifier of a transmitter lowers the power efficiency of the power amplifier. While a complex CM reduction algorithm may be employed on a group of RSs to select RSs with relatively low CMs, employing a CM reduction algorithm usually reduces the number of available RSs in the group. According to one embodiment of the present disclosure, an RS having a relatively low CM may be selected from an RS group (including RSs with high and low CMs) and assigned to a power-limited SS (e.g., a cell-edge SS). Power-limited SSs may be indicated by SSs that are operating at or near maximum transmitter power (e.g., SSs with a transmitter power of about 24 dBm (decibel with respect to one milliwatt)). According to one disclosed approach, low power efficiency is addressed by properly planning the RSs for the cell-edge SSs. As is discussed in further detail below, different techniques may be employed to identify power-limited SSs, e.g., cell-edge SSs.

In general, a length of a demodulation RS ($r_u(k)$) is determined by the number of subcarriers that are assigned to an SS for uplink transmission, because, in general, a demodulation RS should occupy a same set of subcarriers that are utilized for uplink data transmission. For example, when an SS is assigned an uplink of one resource block (e.g., twelve subcarriers in the frequency-domain), an RS having a length of twelve may be employed and ten base sequences may be generated, i.e., $r_u(k)$, $1 \leq u \leq 10$, $0 \leq k \leq N_g - 1$, where $N_g$ is a prime number. The demodulation RS ($r_u(k)$) can then be cyclic extended to a length $N_p$, where $N_p$ is, for example, a multiple of twelve and is equal to the number of subcarriers assigned to the SS. It should be appreciated that an RS may be assigned multiple resource blocks. In this example, a number of orthogonal sequences may be generated from each base sequence using a cyclic shift in the time-domain. The CM for each of the time-domain RSs ($s_u(n)$) may then be calculated by, for example, using:

$$CM = \left(20\log10\left(\sqrt{\sum_{n=0}^{NFFT-1}|s_u(n)|^6 \Big/ \left(\sum_{n=0}^{NFFT-1}|s_u(n)|^2\right)^3}\right) - 1.52\right)\Big/1.56$$

One technique for detecting a power-limited SS (e.g., a cell-edge SS) utilizes a feedback indicator, e.g., a 1-bit indicator, from the SS. In this case, the SS determines whether it is power-limited (e.g., transmitting at maximum or near maximum power) and asserts the 1-bit indicator in a UL data or control message to report a power-limited condition to a serving base station (BS). Alternatively, multiple bits may be employed in a feedback indicator to provide an indication of an extent to which an SS is power-limited. Another technique for detecting a power-limited SS may use a carrier to interference and noise ratio (CINR) calculated, by the serving BS, on a received RS. In this approach, the serving BS calculates a CINR of an RS transmitted from a given SS and compares the calculated CINR to a threshold (e.g., 3.5) to determine whether the given SS is power-limited. According to another aspect of the present disclosure, a power-limited SS may be detected by a serving BS that employs a bandwidth provisioning technique. According to the bandwidth provisioning technique, a scheduler assigns a first bandwidth (e.g., one RB) to a given SS. The serving BS then communicates an initial schedule (including an RS) to the given SS and determines a CINR on the RS transmitted by the given SS over the first bandwidth. The scheduler then increases a bandwidth assigned to the SS to a second bandwidth (e.g., two RBs). The serving BS then communicates a new schedule (including a new RS) to the SS and determines a CINR of the new RS transmitted by the given SS over the second bandwidth. The technique may be extended, e.g., to three RBs, four RBs, etc. In general, if the CINR drops at the wider bandwidth(s), a power-limited SS is indicated.

In the event that the given SS is determined to be power-limited, a low CM RS is assigned to the SS by a scheduler, e.g., a network scheduler. If the SS is later detected to be transmitting at a lower power level (i.e., a power level less than maximum power level), the scheduler may assign a higher CM RS to the SS and assign the low CM RS to another SS that is more power-limited. In this case, a timer may be employed to avoid frequent RS assignment changes (e.g., a ping-pong effect). In at least one embodiment, the proposed technique recognizes that high CM RSs usually only cause low power efficiency in an SS when the RSs are transmitted at a threshold power level, e.g., 24 dBm for cell-edge SSs. In general, low CM RSs are assigned to power-limited SSs to maximize power efficiency of the SS transmitter power amplifier and, correspondingly, reduce nonlinear distortion.

Figure 2:
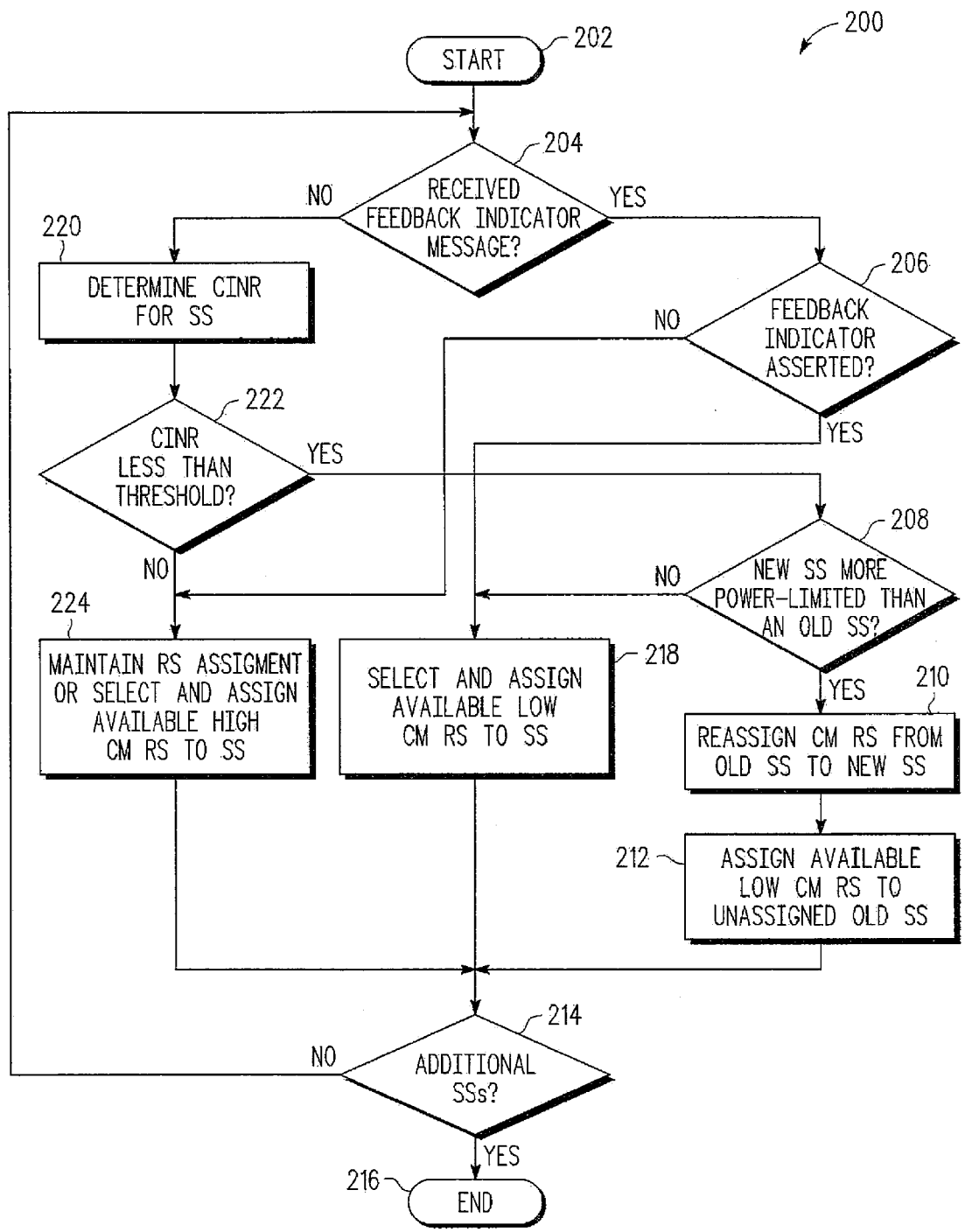
FIG. 2 is a flowchart of an RS assignment process that may be employed, at least in part, in a scheduler of a wireless communication system configured according to the present disclosure.

Turning to FIG. 2, a process 200 for periodically determining whether an RS assignment for an SS requires modification is depicted. Various portions of the process 200 are usually implemented in a base station and a scheduler, e.g., a network-based scheduler, of a wireless communication system. The process 200 is initiated at block 202, at which point control transfers to decision block 204. In block 204, a serving base station (BS) determines whether a feedback indicator message is available from an SS. If a feedback indicator message is received, control transfers to decision block 206, where it is determined whether the feedback indicator is asserted in the feedback indicator message. The feedback indicator may be provided in, for example, a control message or a data message. If the feedback indicator is asserted in block 206, an associated SS is power-limited and control transfers to block 218, where an available low CM RS is selected and assigned (by a scheduler). The assignment may then be transmitted from the serving BS to the SS.

If the feedback indicator is not asserted in block 206, an associated SS is not power-limited and control transfers to block 224, where an RS assignment may be maintained or an available high CM RS may be selected and assigned to the SS. An RS may be selected from, for example, a look-up table that includes multiple RSs that are correlated with a respective CM. From blocks 224 and 218 control transfers to decision block 214, where it is determined whether additional SSs require an RS assignment or an assignment change. For example, the process 200 may be employed periodically to determine whether a specific SS that was not previously power-limited is currently power-limited. If additional SSs require a determination of whether a current RS assignment is still correct, control transfers from block 214 to block 204. If additional SSs do not currently require a determination as to whether the additional SSs RS assignments are currently correct, control transfers from block 214 to block 216, where control returns to a calling routine.

When a feedback indicator message is not received in block 204, control transfers to block 220, where a carrier to interference and noise ratio (CINR) associated with an RS, received from an SS, is determined. While power-control of SSs in a network should ideally provide SSs that have substantially the same CINRs, from the perspective of a serving base station, in practice power-control of SSs is not ideal. Thus, in the absence of SSs that are capable of providing feedback indicator messages, a CINR associated with a given SS may be utilized as a rough indicator of whether a given SS is power-limited. Next, in decision block 222, it is determined whether the CINR is less than a threshold (e.g., 3.5). CINRs may also be used to determine whether one SS is more power-limited than another SS. A CINR of an RS may be determined through any number of different approaches. As a first example, U.S. Patent Application Publication No. 2006/0133260 discloses a channel estimation based approach for estimating CINR that isolates noise and interference components using pilot sequences and estimates a channel power by subtracting a combined noise and interference power estimate from a received power estimate. As a second example, U.S. Patent Application Publication No. 2006/0093074 discloses a difference based approach for estimating CINR that assumes that adjacent pilot locations have the same sub-channel characteristics. Based on this assumption, noise and interference components are isolated by subtracting adjacent received signals.

If the CINR is not less than a threshold, the SS in not power-limited and control transfers from block 222 to block 224. If the CINR is less than the threshold, a power-limited SS is indicated and control transfers from block 222 to decision block 208. In block 208, it is determined (from examining CINRs) whether the SS (current or new SS) is more power-limited than an SS (old SS) that currently has an assigned RS. If the new SS is not more power-limited than any of the old SSs, control transfers from block 208 to block 218. When the new SS is more power-limited than an old SS, control transfers from block 208 to block 210, where the RS of the old SS is reassigned to the new SS. Next, in block 212, an available low CM RS is assigned to the old SS. Following the assignment in block 212, control transfers to block 214.

Figure 3:
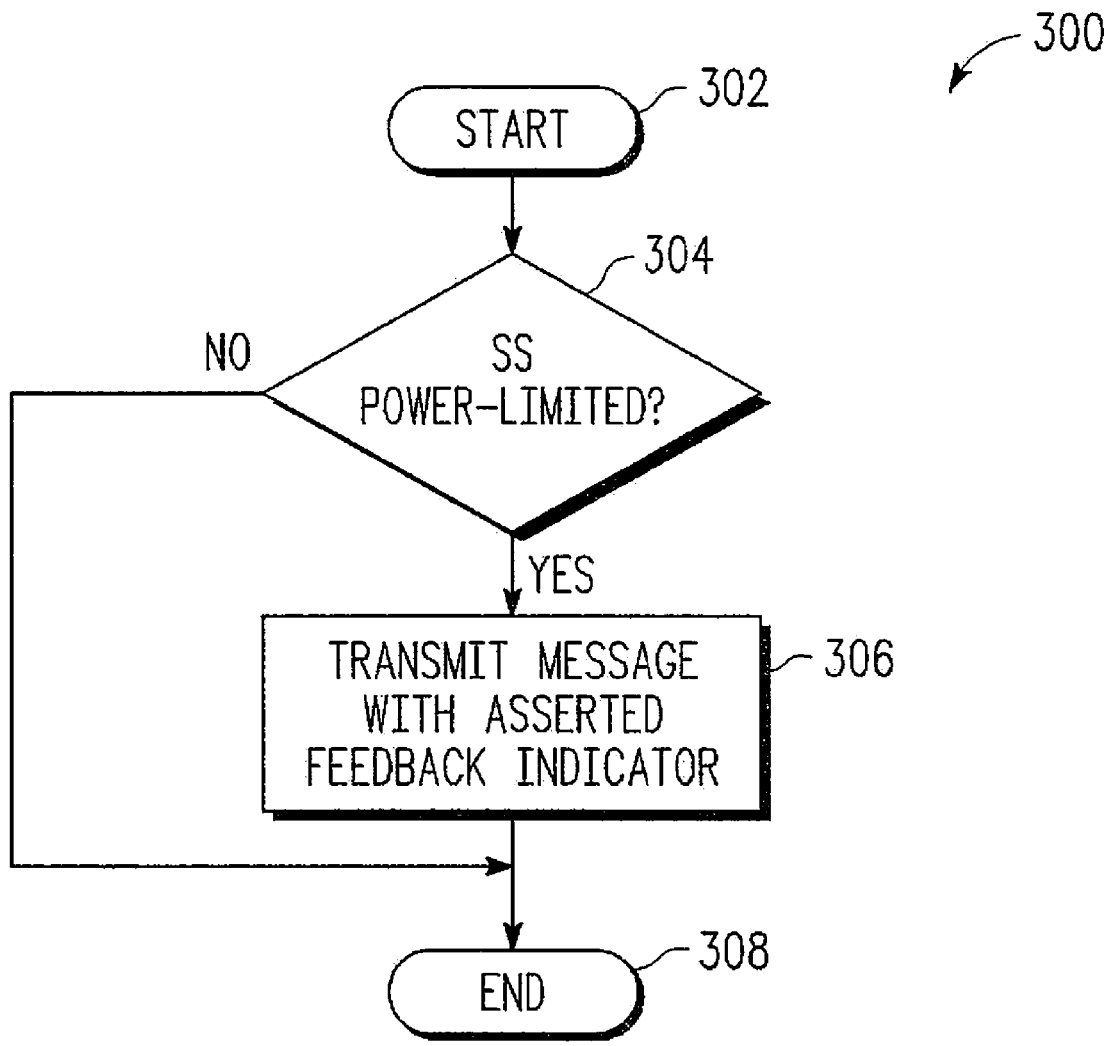
FIG. 3 is a flowchart of a process for determining and reporting whether a given subscriber station (SS) in a wireless communication system is power-limited, according to the present disclosure.

Moving to FIG. 3, a process 300 for determining and reporting whether a given subscriber station (SS) in a wireless communication system is power-limited is illustrated. In block 302, the process 300 is initiated at which point control transfers to decision block 304. In block 304, it is determined whether the SS is power-limited. As noted above, whether an SS is power-limited may be determined by, for example, whether a transmitter of the SS is set to transmit at a maximum or near maximum power level. If the SS is power-limited in block 304, control transfers to block 306, where the SS transmits a data or control message including an asserted feedback indicator to a serving BS. As noted above, multiple feedback indicators may be utilized to provide an indication of the extent to which an SS is power-limited. Following block 306, control transfers to block 308, where control returns to a calling routine. When the SS is not power-limited in block 304, control transfers directly to block 308.

In general, assigning RSs that have relatively high CMs to power-limited SSs (e.g., cell-edge SSs) may result in relatively poor channel estimation for the power-limited SSs. According to another aspect of the present disclosure, poor channel estimation may be addressed by assigning RSs having different CMs (and, thus, different output power back-off (OBO) levels or requirements) to power-limited SSs. The power-limited SSs then alternately transmits the different RSs, based on an assigned schedule. In this manner, averaging of the OBO may be achieved due to the switching between relatively high CMs and relatively low CMs for a given power-limited SS. In this case, a scheduler may assign both a high CM RS and a low CM RS to a given SS.

It should be appreciated that a scheduler does not necessarily have to determine a CM associated with a particular RS, assuming the selection of an available RS is substantially random and an RS table of available RSs includes a random selection of RSs having associated high and low CMs. Alternatively, a scheduler may select high CM RSs and low CM RSs from different RS tables (i.e., a high CM RS table and a low CM RS table). As another alternative, a scheduler may assign a high CM RS to a given SS for a first time period and a low CM RS to the given SS for a second time period. In general, the first and second time periods are substantially equal. For example, the first and second time periods may correspond to slot 0 and slot 1, respectively, of a UL subframe. Alternatively, the first and second time periods may each correspond to multiple subframes. With reference to FIG. 1, a high (low) CM RS may be assigned to the RS in slot 0 and a low (high) CM RS may be assigned to the RS in slot 1. According to the RS switching (hopping) approach, a serving base station does not necessarily have to determine whether a given SS is power-limited before RSs are assigned to the given SS. It should be appreciated that more than two RSs may be assigned to an SS according to the disclosed technique. In this case, the SS would alternately transmit the assigned RSs and the serving base station would average the channel estimation based on the RSs received from the SS.

Figure 7:
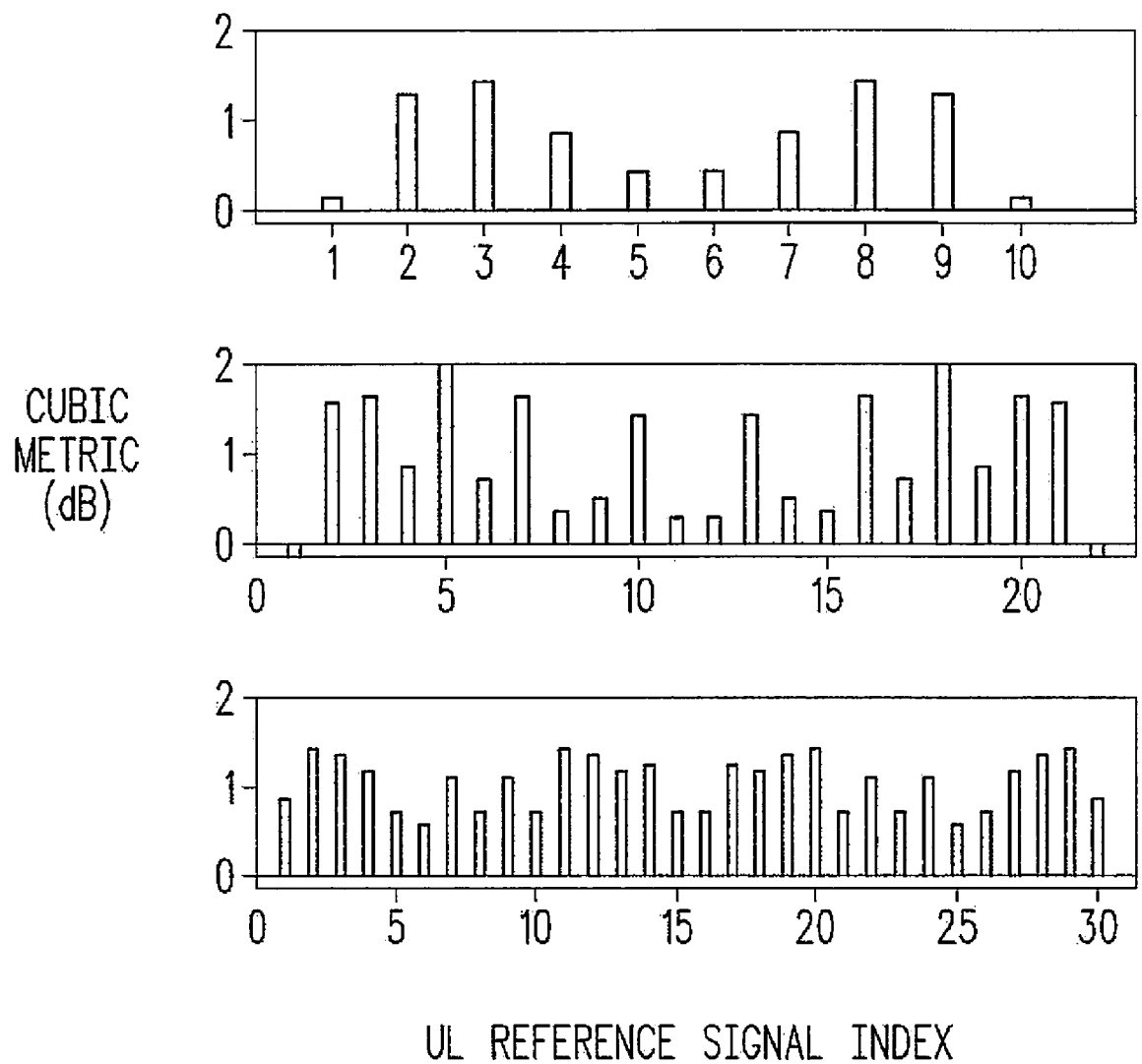
FIG. 7 is an example graph that plots cubic metrics (CMs) for base sequences of RSs that employ one resource block (top), two resource blocks (middle), and three resource blocks (bottom).

With reference to FIG. 7, a number of example UL demodulation RSs are plotted with respect to cubic metric. As is illustrated, the UL demodulation RSs have widely varying cubic metrics. According to various aspects of the present disclosure, proper planning of RSs ensures adequate performance of cell-edge SSs. In general, the hopping RS technique pairs a low CM RS with a high CM RS. The technique may be implemented by calculating the CMs of the demodulation RSs, sorting the demodulation RSs by their CMs, and pairing low and high CM RSs. For example, a UL demodulation RS (top graph) that uses one resource block (RB) provides base sequences that may employ the following grouping pairs: (1, 8); (3, 10); (2, 6); (5, 9); and (4, 7). A UL demodulation RS (middle graph) that uses two RBs provides base sequences that may employ the following grouping pairs: (1, 18); (22, 5); (12, 20); (11, 3); (15, 16); (8, 7); (9, 2); (14, 21); (6, 13); (17, 10); and (4, 19). A UL demodulation RS (bottom graph) that uses three RBs provides base sequences that may employ the following grouping pairs: (6, 29); (25, 2); (15, 3); (16, 28); (10, 11); (21, 20); (23, 19); (8, 12); (5, 4); (26, 27); (30, 17); (1, 14); (7, 18); (24, 13); and (22, 9).

Figure 4:
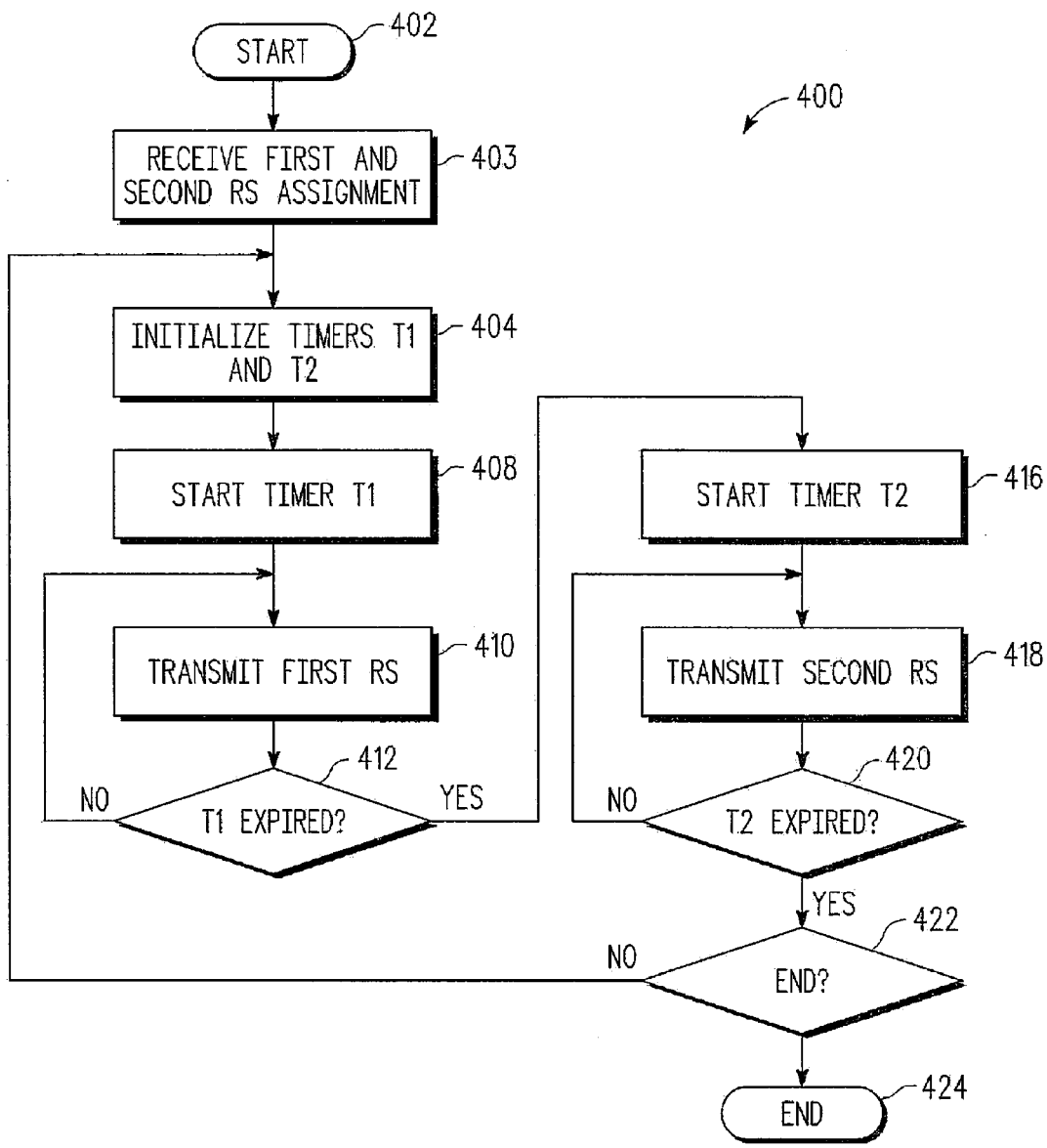
FIG. 4 is a flowchart of an RS transmission process that may be employed in an SS of a wireless communication system, according to another embodiment of the present disclosure.

Turning to FIG. 4, an example RS transmission process 400, that may be employed in an SS of a wireless communication system, is depicted. The process 400 causes an SS to switch between transmitting RSs having high and low CMs in order to average an OBO of a transmitter of the SS. It should be appreciated that the terms high CM and low CM are relative terms and may, or may not, indicate that a high CM corresponds to a maximum available CM or a low CM corresponds to a minimum available CM. In block 402 the process 400 is initiated, at which control transfers to block 403, where the SS receives an assignment of a first RS and a second RS from a serving BS. Next, in block 404, two timers (T1 and T2) are initialized. Then, in block 408, the timer T1 is started. Next, in block 410, the SS transmits the first RS to the serving BS. The serving BS then performs channel estimation based on the first RS. Then, in decision block 412, it is determined whether the timer T1 has expired. If the timer T1 has not expired, control transfers from block 412 to block 410, where additional first RSs are transmitted. It should be appreciated that one or more first RSs may be transmitted during the time period set by the timer T1. If the timer T1 has expired in block 412, control transfers from block 412 to block 416.

In block 416, the timer T2 is started. Next, in block 418, the second RS is transmitted by the SS to the serving BS, which performs channel estimation based on the first and second RSs (i.e., averages the channel estimation based on the first and second RSs). Then, in decision block 420, it is determined whether the timer T2 has expired. If the timer T2 has not expired, control transfers from block 420 to block 418, where additional second RSs may be transmitted. If the timer T2 has expired in block 420, control transfers to block 422, where control transfers to block 404 while the SS is active. In block 422, when the SS is no longer active, control transfers to block 424, where control returns to a calling routine. It should be appreciated that one or more second RSs may be received during the time period set by the timer T2. In this approach, the serving BS receives both the first and second RSs and averages the first and second RSs to perform channel estimation. While the approach is not usually as ideal as an approach that utilizes RSs with only low CMs, the approach does provide satisfactory results in most cases.

Figure 5:
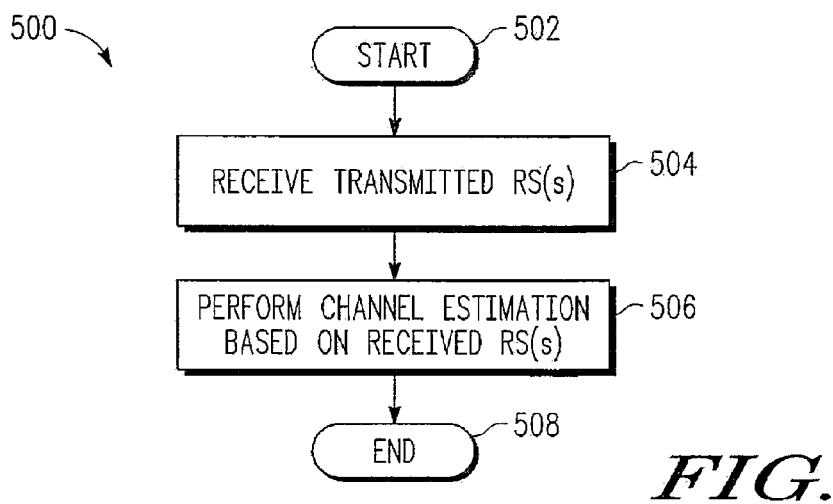

FIG. 5 depicts a process 500 for receiving a transmitted RS (or RSs), at a serving BS, and performing channel estimation based on the received RS(s). The process 500 is initiated at block 502, at which point control transfers to block 504, where one or more transmitted RSs are received. Next, in block 506, the serving BS performs channel estimation based on the received RS(s). Following block 506, control returns to a calling routine in block 508.

Figure 6:
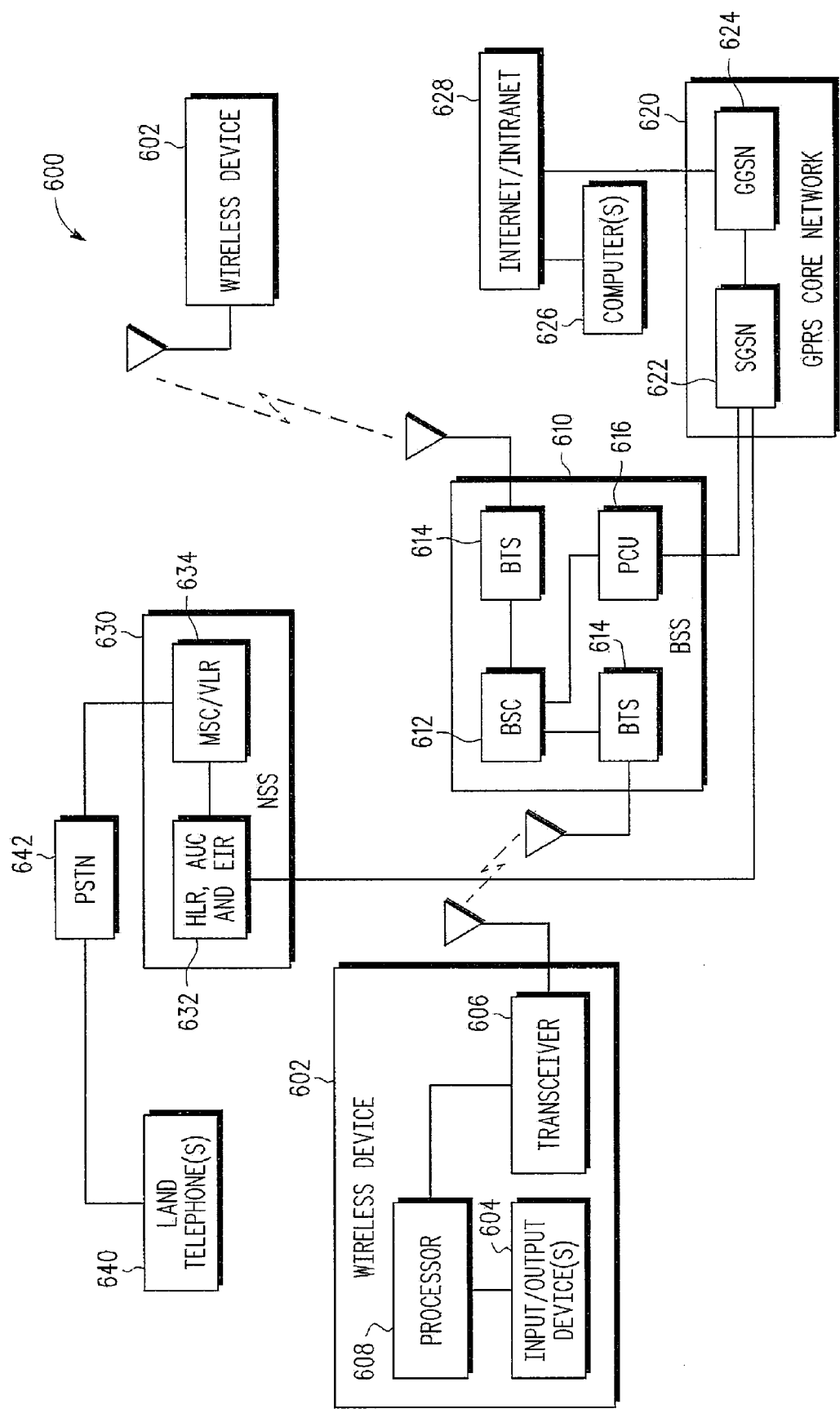
FIG. 6 is a block diagram of an example wireless communication system that assigns RSs to SSs according to various embodiments of the present disclosure.

With reference to FIG. 6, an example wireless communication system 600 is depicted that includes a plurality of subscriber stations or wireless devices 602, e.g., hand-held computers, personal digital assistants (PDAs), cellular telephones, etc., that implements communication links according to one or more embodiments of the present disclosure. In general, the wireless devices 602 include a processor 608 (e.g., a digital signal processor (DSP)), a transceiver 606 and one or more input/output devices 604 (e.g., a camera, a keypad, display, etc.), among other components not shown in FIG. 6. As is noted above, according to various embodiments of the present disclosure, a technique is disclosed that improves channel estimation for a wireless communication device, such as the wireless devices 602. The wireless devices 602 communicate with a base station controller (BSC) 612 of a base station subsystem (BSS) 610, via one or more base transceiver stations (BTS) 614, to receive or transmit voice and/or data. The BSC 612 may, for example, employ a scheduler for assigning one or more RSs to each of the wireless devices 602. In general, the BSC 612 may also be configured to choose a modulation and coding scheme (MCS) for each of the devices 602, based on channel conditions.

The BSC 612 is also in communication with a packet control unit (PCU) 616, which is in communication with a serving general packet radio service (GPRS) support node (SGSN) 622. The SGSN 622 is in communication with a gateway GPRS support node (GGSN) 624, both of which are included within a GPRS core network 620. The GGSN 624 provides access to computer(s) 626 coupled to Internet/intranet 628. In this manner, the wireless devices 602 may receive data from and/or transmit data to computers coupled to the Internet/intranet 628. For example, when the devices 602 include a camera, images may be transferred to a computer 626 coupled to the Internet/intranet 628 or to another one of the devices 602. The BSC 612 is also in communication with a mobile switching center/visitor location register (MSC/VLR) 634, which is in communication with a home location register (HLR), an authentication center (AUC), and an equipment identity register (EIR) 632. In a typical implementation, the MSC/VLR 634 and the HLR, AUC, and EIR 632 are located within a network and switching subsystem (NSS) 630, which performs various functions for the system 600. The SGSN 622 may communicate directly with the HLR, AUC, and EIR 632. As is also shown, the MSC/VLR 634 is in communication with a public switched telephone network (PSTN) 642, which facilitates communication between wireless devices 602 and land telephone(s) 640.

Accordingly, a number of techniques have been disclosed herein that improve link performance in a wireless network. While the discussion herein has been primarily directed to improving communication on an uplink of a wireless communication system, it is contemplated that many of the techniques disclosed herein may be equally applicable to improving communication on a downlink of a wireless communication system.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, many of the techniques disclosed herein are applicable to downlinks of wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of improving link performance in a wireless network, comprising:
    detecting whether subscriber stations in the wireless network are power-limited, the subscriber stations including a first subscriber station that is power-limited and a second subscriber station that is not power-limited; and
    assigning a first reference signal having a first cubic metric to the first subscriber station and a second reference signal having a second cubic metric to the second subscriber station, wherein the first cubic metric is lower in magnitude than the second cubic metric.

2. The method of claim 1, wherein the detecting further comprises:
    receiving respective feedback indicators from the subscriber stations; and
    examining the respective feedback indicators to determine whether the subscriber stations are power-limited.

3. The method of claim 1, wherein the detecting further comprises:
    determining respective carrier to interference and noise ratios associated with the subscriber stations; and
    comparing the respective carrier to interference and noise ratios associated with the subscriber stations to a threshold to determine whether the subscriber stations are power-limited.

4. The method of claim 1, wherein the first and second reference signals are included with a reference signal group and the method further comprises:
    determining when one of the subscriber stations is more power-limited than another one of the subscriber stations;
    reassigning, from a less power-limited one of the subscriber stations, a lower cubic metric reference signal, included with the reference signal group, to the more power-limited one of the subscriber stations; and
    assigning a higher cubic metric reference signal, included within the reference signal group, to the less power-limited one of the subscriber stations, wherein the higher cubic metric reference signal has a higher associated cubic metric that the lower cubic metric reference signal.

5. The method of claim 1, further comprising:
    selecting the first and second reference signals from a look-up table including multiple reference signals that are each correlated with a respective cubic metric.

6. The method of claim 1, further comprising:
    determining, based on a transmitter power setting, whether one of the subscriber stations is power-limited; and
    transmitting, from a power-limited one of the subscribers stations, a message including an asserted feedback indicator to a serving base station, the asserted feedback indicator indicating that the power-limited one of the subscriber stations is power-limited.

7. The method of claim 1, wherein the first subscriber station is substantially positioned at a cell-edge and the method further comprises:
    transmitting, from the first subscriber station, the first reference signal at a first output power back-off level associated with the first reference signal.

8. A method of improving link performance in a wireless communication system, comprising:
    receiving, at a serving base station, a first reference signal transmitted by a subscriber station during a first time period at a first output power back-off level associated with the first reference signal;
    receiving, at the serving base station, a second reference signal transmitted by the subscriber station during a second time period at a second output power back-off level associated with the second reference signal, wherein the first and second reference signals have different cubic metrics; and
    performing, at the serving base station, channel estimation for the subscriber station based on an average of the first and second reference signals.

9. The method of claim 8, wherein the subscriber station is configured to repeat transmission of the first reference signal and the second reference signal while the subscriber station is active.

10. The method of claim 8, wherein the subscriber station is substantially positioned at a cell-edge.

11. The method of claim 8, wherein the first time period corresponds to a first slot of an uplink subframe and the second time period corresponds to a second slot of the uplink subframe.

12. The method of claim 8, wherein the first time period corresponds to at least one first uplink subframe and the second time period corresponds to at least one second uplink subframe, and wherein the first and second uplink subframes are in different frames.

13. A wireless communication system, comprising:
    multiple subscriber stations, the multiple subscriber stations including a first subscriber station that is power-limited and a second subscriber station that is not power-limited;
    a base station in communication with the multiple subscriber stations, wherein the base station is configured to detect whether the multiple subscriber stations are power-limited; and
    a scheduler in communication with the base station, wherein the scheduler is configured to assign a first reference signal having a first cubic metric to the first subscriber station and a second reference signal having a second cubic metric to the second subscriber station, and wherein the first cubic metric is lower in magnitude than the second cubic metric.

14. The system of claim 13, wherein base station is further configured to receive respective feedback indicators from the multiple subscriber stations and examine the respective feedback indicators to determine whether the multiple subscriber stations are power-limited.

15. The system of claim 14, wherein the first and second reference signals are included within a reference signal group and the base station is further configured to determine when one of the multiple subscriber stations is more power-limited than another one of the multiple subscriber stations and the scheduler is further configured to reassign, from a less power-limited one of the multiple subscriber stations, a lower cubic metric reference signal, included with the reference signal group, to the more power-limited one of the multiple subscriber stations and assign a higher cubic metric reference signal, included within the reference signal group, to the less power-limited one of the multiple subscriber stations, wherein the higher cubic metric reference signal has a higher associated cubic metric that the lower cubic metric reference signal.

16. The system of claim 13, wherein the scheduler is further configured to select the first and second reference signals from a look-up table including multiple reference signals that are each correlated with an associated cubic metric.

17. The system of claim 13, wherein each of the multiple subscriber stations is configured to determine, based on a respective transmitter power setting, whether it is power-limited, and wherein each of the multiple subscriber stations is further configured to transmit a message, including a feedback indicator, to the base station to indicate whether it is power-limited.

18. The system of claim 13, wherein the first subscriber station is substantially located at a cell-edge and the first subscriber station is further configured to transmit the first reference signal at a first output power back-off level associated with the first reference signal.

19. The system of claim 13, wherein the second subscriber station is substantially located at the base station and the second subscriber station is further configured to transmit the second reference signal at a second output power back-off level associated with the second reference signal.

* * * * *